(12) United States Patent
Rostami

(10) Patent No.: US 7,343,184 B2
(45) Date of Patent: Mar. 11, 2008

(54) HANDHELD DEVICE PROTECTIVE CASE

(76) Inventor: Ramin Rostami, 130 W. Cochran St., Simi Valley, CA (US) 93065

( * ) Notice: Subject to any disclaimer, the term of this patent is extended or adjusted under 35 U.S.C. 154(b) by 0 days.

(21) Appl. No.: 11/757,274

(22) Filed: Jun. 1, 2007

(65) Prior Publication Data
US 2008/0035253 A1  Feb. 14, 2008

Related U.S. Application Data

(63) Continuation of application No. 11/462,032, filed on Aug. 2, 2006.

(51) Int. Cl.
*H04Q 7/32* (2006.01)
(52) U.S. Cl. .............. 455/575.8; 455/575.1; 455/550.1; 455/575.6; 455/557; 455/575.4; 455/90.3; 455/422.1; 379/440; 379/441; 379/428.01; 379/433.01; 379/433.11; 379/437; 224/666
(58) Field of Classification Search ........... 455/575.8, 455/575.1, 550.1, 575.6, 575.2, 557, 556.1, 455/566, 575.4, 90.1, 90.2, 90.3, 500, 73, 455/422.1, 403, 517; 379/440, 441, 428.01, 379/450, 451, 433.01, 433.11, 437; 224/666; D14/137, 138, 140, 144, 250, 252, 265
See application file for complete search history.

(56) References Cited

U.S. PATENT DOCUMENTS

| 5,383,091 | A | 1/1995 | Snell |
| 5,542,105 | A | 7/1996 | Finch |
| 5,610,979 | A | 3/1997 | Yu |
| 5,816,459 | A | 10/1998 | Armistead |
| 5,833,100 | A | 11/1998 | Kim |
| 6,050,465 | A | 4/2000 | Nelson et al. |
| 6,081,595 | A | 6/2000 | Picaud |
| 6,130,945 | A | 10/2000 | Shin |
| 6,201,867 | B1 | 3/2001 | Koike |
| 6,308,074 | B1 | 10/2001 | Chandra et al. |
| 6,341,217 | B1 | 1/2002 | Wong |
| 6,346,824 | B1 | 2/2002 | Yamada |

(Continued)

FOREIGN PATENT DOCUMENTS

JP  4023547  1/1992

(Continued)

OTHER PUBLICATIONS

Banko, Sarah, Signature Leather Case for iPhone in Phantom Black, internet advertisement, Jun. 30, 2007, United States.

(Continued)

*Primary Examiner*—Keith T. Ferguson
(74) *Attorney, Agent, or Firm*—Marshall A. Lerner; Jonathan Pearce; Kleinberg & Lerner, LLP

(57) ABSTRACT

A protective cover for handheld devices. The protective cover containing a hardened plastic protective inner layer and a soft outer layer. The protective cover containing at least one cavity for mounting the associated segment of the handheld device therein and at least one fitted notch to secure the piece to the associated segment. The protective cover further containing at least one window for providing exposure to the surface of the associated segment.

14 Claims, 6 Drawing Sheets

U.S. PATENT DOCUMENTS

| | | |
|---|---|---|
| 6,430,400 B1 | 8/2002 | MacDonald, Jr. et al. |
| 6,612,432 B2 | 9/2003 | Motson |
| 6,754,344 B2 | 6/2004 | Kohli et al. |
| 6,772,879 B1 | 8/2004 | Domotor |
| 6,785,566 B1 | 8/2004 | Irizarry |
| 6,839,432 B1 | 1/2005 | Martin |
| 6,980,777 B2 | 12/2005 | Shepherd et al. |
| 7,069,063 B2 | 6/2006 | Halkosaari et al. |
| 7,079,879 B1 | 7/2006 | Sylvester et al. |
| 7,099,710 B1 | 8/2006 | Faillance |
| 7,194,291 B2 | 3/2007 | Peng |
| 7,197,345 B2 | 3/2007 | Kim et al. |
| 2002/0137475 A1 | 9/2002 | Shou et al. |
| 2003/0003864 A1 | 1/2003 | Locke |
| 2003/0032442 A1 | 2/2003 | Kuo |
| 2003/0068035 A1 | 4/2003 | Pirila et al. |
| 2003/0083094 A1 | 5/2003 | Hsu et al. |
| 2004/0014506 A1 | 1/2004 | Kemppinen |
| 2004/0097276 A1 | 5/2004 | Harmon |
| 2004/0166910 A1 | 8/2004 | Ha et al. |
| 2004/0173482 A1 | 9/2004 | Nieves |
| 2004/0204204 A1 | 10/2004 | Brilliant et al. |
| 2004/0218758 A1* | 11/2004 | Kohli et al. ............... 379/440 |
| 2005/0153757 A1 | 7/2005 | Maenpaa et al. |
| 2006/0100005 A1 | 5/2006 | Chen et al. |
| 2006/0116183 A1 | 6/2006 | Inanti |
| 2006/0160586 A1* | 7/2006 | Cheng ................... 455/575.8 |
| 2006/0172765 A1 | 8/2006 | Lev |
| 2006/0175370 A1* | 8/2006 | Arney et al. ............... 224/666 |
| 2006/0279924 A1 | 12/2006 | Richardson et al. |
| 2007/0099650 A1 | 5/2007 | Brunstrom et al. |
| 2007/0201689 A1* | 8/2007 | Uramoto et al. ........... 379/451 |

FOREIGN PATENT DOCUMENTS

| | | |
|---|---|---|
| JP | 10190274 | 7/1998 |
| JP | 2003234814 | 8/2003 |
| JP | 20060199909 | 1/2006 |

OTHER PUBLICATIONS

McArthy, Jim, Complete Protection for your iPod nano with style and functionality: the dual-layer iSkin Duo, Gadgetme Newsletter, Jan. 2006, United States.

* cited by examiner

HANDHELD DEVICE PROTECTIVE CASE

CROSS-REFERENCE TO RELATED APPLICATIONS

The present application is a continuation of co-pending U.S. patent application Ser. No. 11/462,032 filed Aug. 2, 2006 entitled Handheld Device Protective Case. The present application claims priority on the basis of the U.S. patent application Ser. No. 11/462,032.

BACKGROUND OF THE INVENTION

1. Field of the Invention

The present invention relates to a single-piece or multiple-component protective case for handheld devices, such as a personal digital assistant, cellular telephone, lab top computers or portable digital media player, and more particularly relates to protective case for a handheld device having a protective hardened plastic interior layer and a fashionable soft exterior layer.

2. Description of the Related Art

With the advancement of technology in the fields of electronics and computers, more powerful features and elements have been integrated into handheld electronic devices. Compact hard drives, processors, and liquid crystal displays boasting the computational equivalent of desktop computers have been integrated into handheld devices the size of a computer mouse. However, the integration of these innovations into handheld devices has amounted to the production of very expensive and delicate devices. Accessories, in the form of protective cases or protective shells, have been produced to keep the handheld devices safe from unexpected incidents due to mishandling. However, the existing protective cases and protective shells fail to incorporate protective shielding while offering a fashionable, stylish exterior accentuating the individual style of each end user.

In order to protect the handheld devices sufficiently the protective case must incorporate suitable protective cover that encompasses a substantial portion of the device, as well as provide a tight fit in which the device can be secured. In addition the protective case must be adaptable for use with handheld devices that have moving parts associated with the functions of the handheld device. The use of hard plastics to produce protective cases has lead to a sufficiently protective case for the handheld device, but the inherent look and feel of plastic has cheapened the appearance and texture of the expensive, highly advanced handheld devices. Alternatively, the use of textile fabrics, namely, leather and vinyl, have been used to protect the handheld devices, however, these fabrics have been less effective in properly protecting the device. In addition, the use of textile fabrics has been associated with wear and tear over time, leading to diminished protection and unsightly deformities in the protective cover.

The integration of these handheld devices as everyday essential items has opened the pathway for designers to introduce a fashionable design element into each handheld device. Most recently handheld devices have become fashion accessories adopting sleek designs, polished and/or rare metals and even jewels to accentuate the value of the device.

The protective and fashionable solution offered in the industry have failed to realize the importance of these changes, and the transition of once utilitarian handheld devices to fashionable accessories has lead to a demand in the market place for a protective device capable of addressing the recent fashionable element. The current market is in demand of a protective cover that can integrate the functions of protecting the delicate handheld device while retaining or enhancing the aesthetically pleasant look of the handheld device.

The present invention recognizes and addresses the particular need for a protective case for a handheld device capable of sufficiently protecting the handheld device while incorporating an aesthetically pleasing and attractive element to the individual end user.

SUMMARY OF THE INVENTION

The present invention provides a novel protective case for handheld devices that incorporates a fashionable element.

More specifically, the invention comprises a protective case made of a hardened plastic inner layer, capable of sufficiently protecting the handheld device. The case further provides an outer layer of a relatively soft material. The soft outer layer incorporates a fashionable element on the soft material.

The protective case is produced by a two step manufacturing process which reduces cost and increases efficiency while incorporating a unique element for adhering the soft outer layer to the hard inner layer. The first step involves the injection molding of the plastic base inner layer which is the protective backbone of the present invention. The plastic inner layer is strong enough to protect the handheld device, while flexible enough to absorb a limited amount of abuse.

The second step of the manufacturing process includes the adhering of the fashionable soft outer layer to the molded plastic inner layer. The outer layer may be in the form of a soft material such as textile, leather, PVC, Nubuck, synthetic fabrics and carbon. The soft outer layer is attached to the plastic inner layer using an adhesive. The edges of the soft outer layer are attached to the plastic inner layer using a special heat process designed to permanently adhere the soft outer layer to the plastic inner layer. The heat processing nearly eliminates the possibility of the soft outer layer detaching or fraying from the plastic inner layer.

The protective case consists of one or more components independently attached to the handheld device, allowing for full operation of all features of the handheld device to be operated while the protective cover remains attached. In the event the handheld device requires the activation of moving pieces for operation, such as a flip-type cellular telephone or a twistable personal digital assistant, the protective case remains attached to the handheld device in operation.

BRIEF DESCRIPTION OF THE DRAWINGS

The descriptions which follow are to be understood as illustrative and exemplary of specific structures, aspects and features within the broad scope of the present invention and not as limiting of such broad scope. Like numbers refer to similar features of like elements throughout.

DESCRIPTION OF THE PREFERRED EMBODIMENTS

Figure 1:
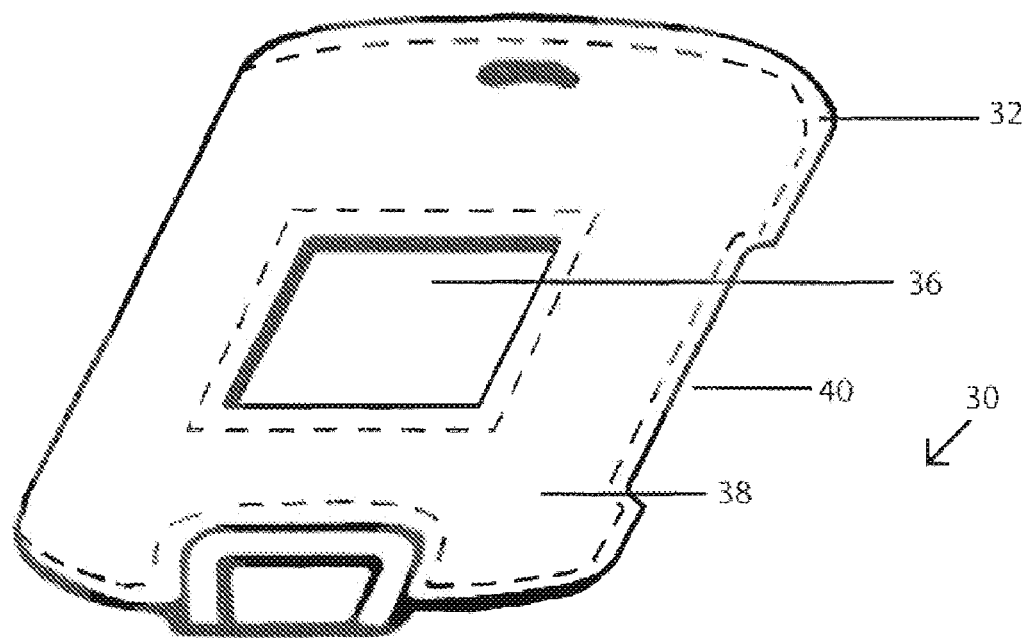
FIG. 1 is a perspective view of a handheld device protective case depicting the outer layer of the protective carrying case.
Figure 1:
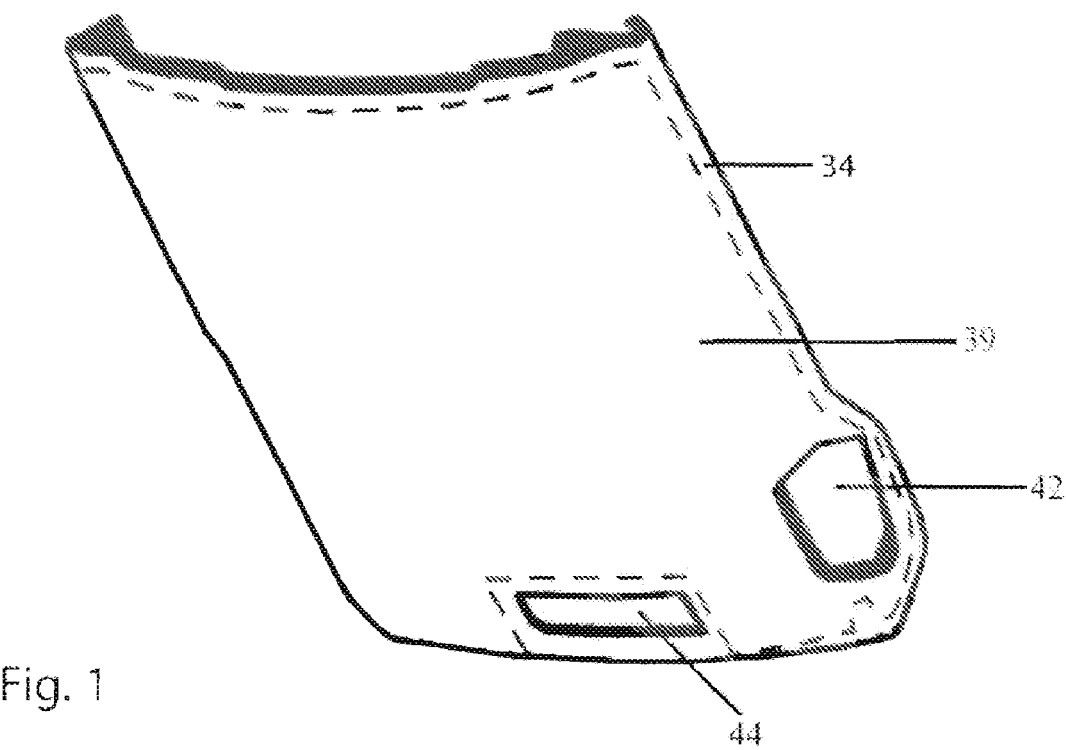

The invention will now be described with reference to FIG. 1, which is a perspective view of the handheld device protective case 30 depicting the outer layer of the protective case 30, comprising two separate components, an upper component 32 and a lower component 34. The upper component 32 and lower component 34 are molded to independently attach to the handheld device and incorporate at least one viewing window 36, and input/output access ports 40, 42 and 44.

With further reference to FIG. 1, the soft outer layer 38 is attached to the inner layer of the upper component 32 and the soft outer layer 39 is attached to the inner layer of the lower component 34. The soft outer layers 38 and 39 are attached utilizing a heat treated chemical which permanently attaches the soft outer layers 38 and 39 to the inner layers of the upper component 32 and lower component 34, respectively.

Figure 2:
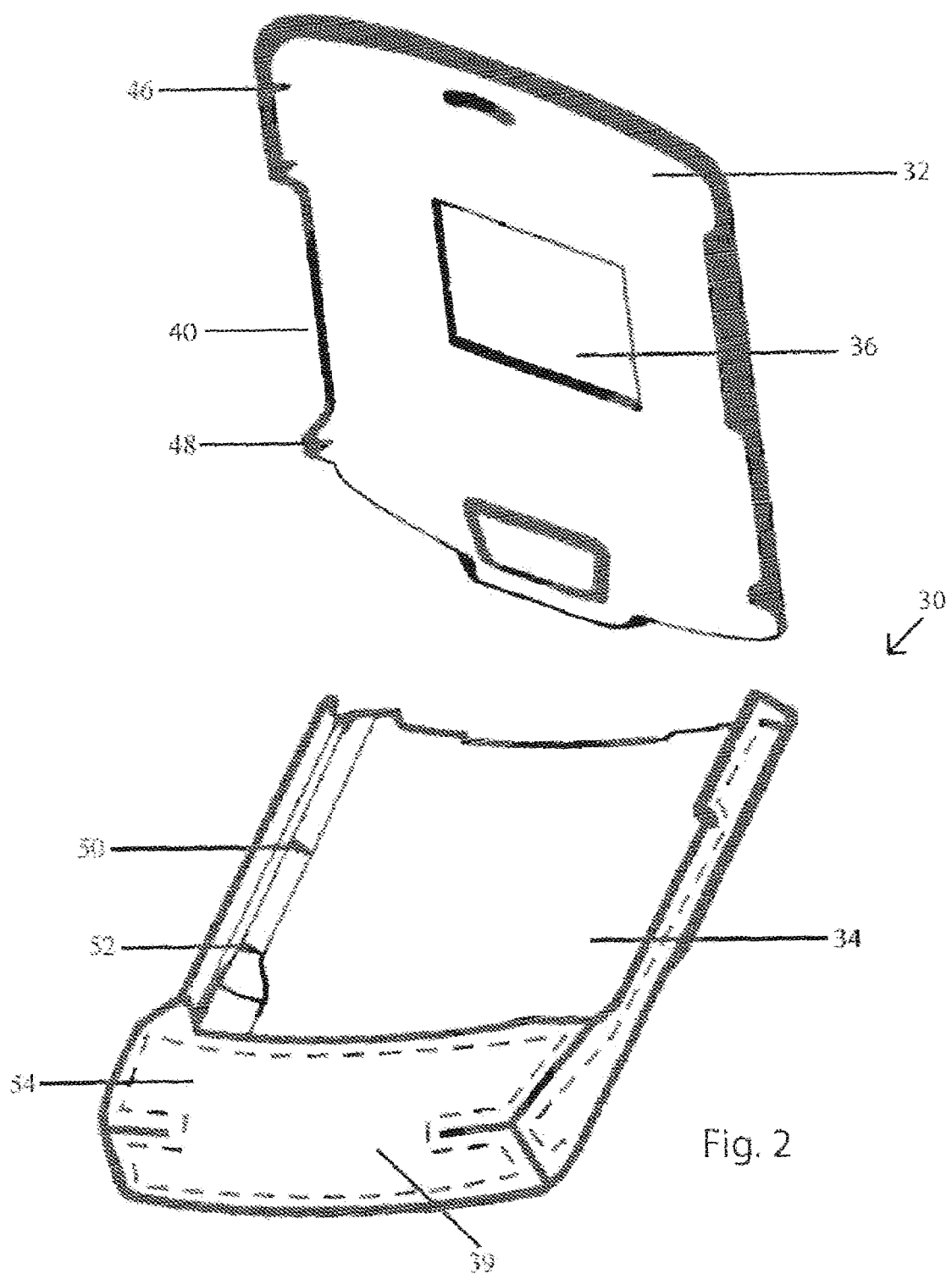
FIG. 2 is a perspective view of a handheld device protective case depicting the inner layer of the protective carrying case.

FIG. 2 is a perspective view of the handheld device protective case 30 depicting the inner layer of the protective case 30, comprising two separate components, the upper component 32 and lower component 34. The upper component 32 incorporates at least one viewing window 36 and at least one input/output access port 40 intended to give the end user access to functions found on the handheld device. The upper component 32 is fitted to clasp onto the handheld device, and incorporates fitted notches 46 and 48 to ensure a snug and secure fit.

With further reference to FIG. 2, the loner component 34 is attached to the handheld device incorporating a fitted cavity 54 found at the bottom of the lower component 34. The lower component 34 is further fitted to clasp onto the handheld device and incorporates fitted notches 50 and 52 to ensure a snug and secure fit.

FIG. 2 further depicts the soft outer layer 39 found on the lower component 34 fitted cavity 54. The soft outer layer 39 is attached to the lower component 34 utilizing a heat treated chemical which permanently attaches the soft outer layer 39.

Figure 3:
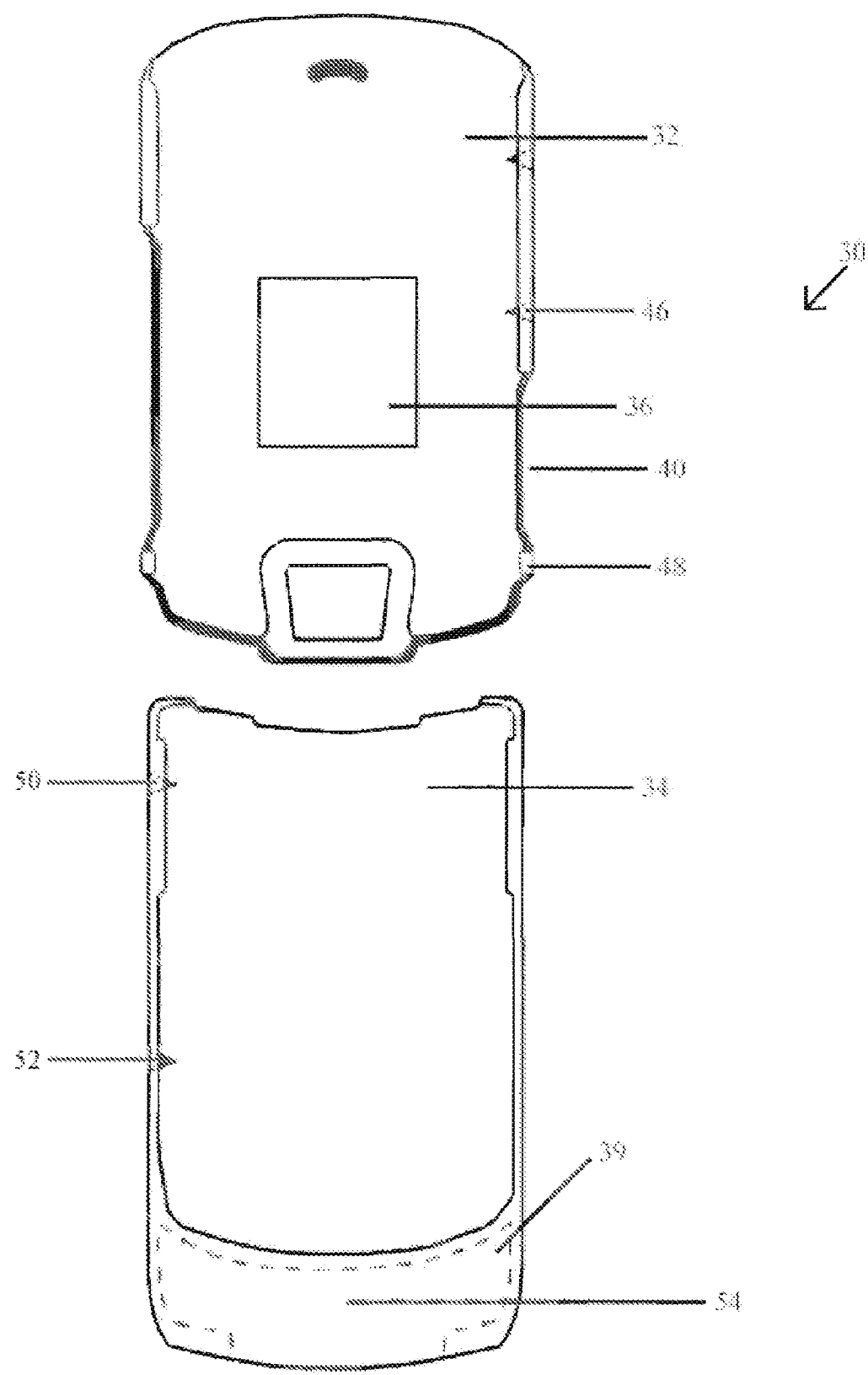
FIG. 3 is a front elevation view of a handheld device protective case depicting the inner layer.

FIG. 3 is a front elevation view of a protective case 30 depiction the inner surface, comprising two separate components, the upper component 32 and lower component 34. The upper component 32 incorporates at least one viewing window 36 and at least one input/output access port 40 intended to give the end user access to functions found on the handheld device. The upper component 32 is fitted to clasp onto the handheld device, and incorporates fitted notches 46 and 48 to ensure a snug and secure fit.

As shown in FIG. 3, the lower component 34 is attached to the handheld device incorporating a fitted cavity 54 found at the bottom of the lower component 34. The lower component 34 is further fitted to clasp onto the handheld device and incorporates fitted notches 50 and 52 to ensure a snug and secure fit.

FIG. 3 further depicts the textile soft outer layer 39 found on the lower case 34 fitted cavity 54. The soft outer layer 39 is attached to the lower case 34 utilizing a heat treated chemical which permanently attaches the soft outer layer 39.

Figure 4:
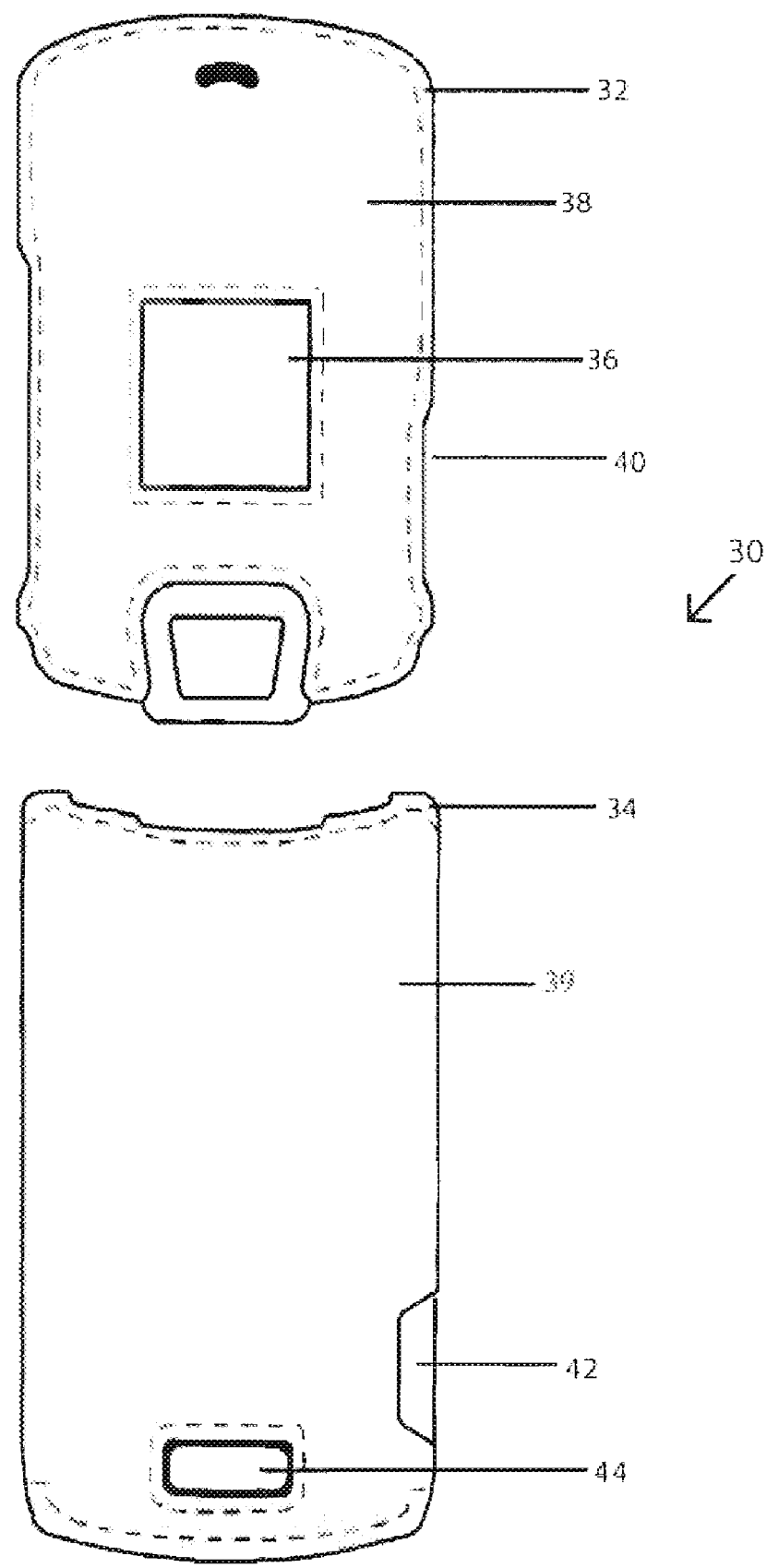
FIG. 4 is a front elevation view of a handheld device protective case depicting the outer layer.

FIG. 4 is a front elevation view of a handheld device protective case depicting the outer surface, comprising two separate components, the upper component 32 and lower component 34. The upper component 32 incorporates at least one viewing window 36 and at least one input/output access port 40 intended to give the end user access to functions found on the handheld device. The lower component 34 incorporates input/output access ports 42 and 44 intended to give the end user access to functions found on the handheld device.

With further reference to FIG. 4, the soft outer layer 38 is attached to the outer surface of the upper component 32 and the soft outer layer 39 is attached to the outer surface of the lower component 34. The soft outer layers 38 and 39 are attached utilizing a heat treated chemical which permanently attaches the soft outer layers 38 and 39 to the upper component 32 and lower component 34, respectively.

Figure 5:
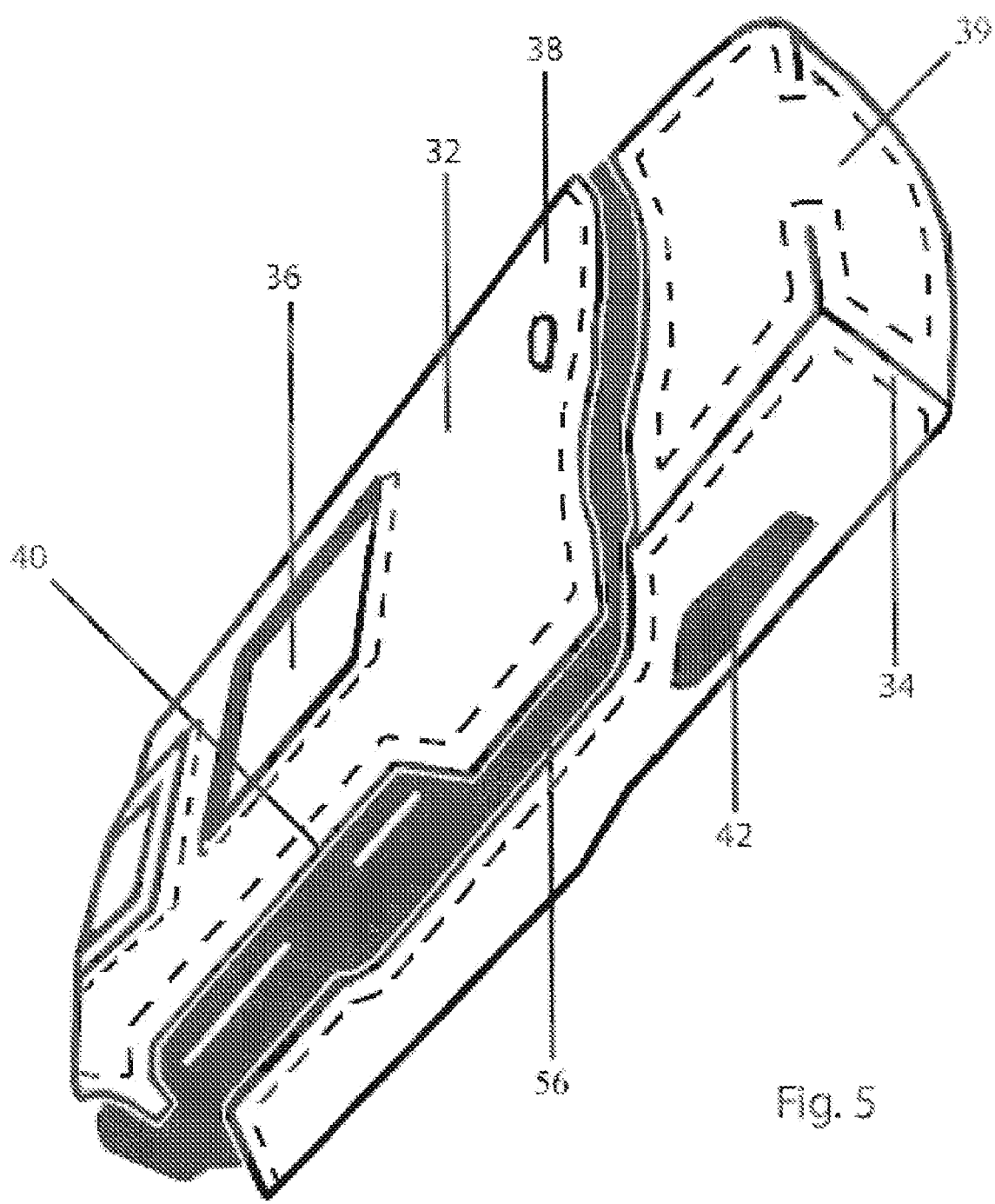
FIG. 5 is a perspective view of the handheld device protective case attached to a sample handheld device in the closed position.

FIG. 5 is a perspective view of the handheld device protective case 30 attached to a sample handheld device 56 in the closed position. The upper component 32 is attached the handheld device 56 and incorporates at least one viewing window 36 and at least one input/output access port 40 intended to give the end user access to functions found on the handheld device. The lower component 34 is attached to the handheld device 56 and incorporates at least one input/output access port 42 intended to give the end user access to functions found on the handheld device.

As further shown in FIG. 5, the soft outer layer 38 is attached to the outer surface of the upper component 32, and the soft outer layer 39 is attached to the outer surface of the lower component 34. The soft outer layers 38 and 39 are attached utilizing a heat treated chemical which permanently attaches the soft outer layers 38 and 39 to the upper component 32 and lower component 34, respectively.

FIG. 5 further depicts the protective case 30 attached to the sample handheld device 56 which is found in the closed position. The input/output access ports 40 and 42 allow for operation of the functions found on the handheld device 56.

Figure 6:
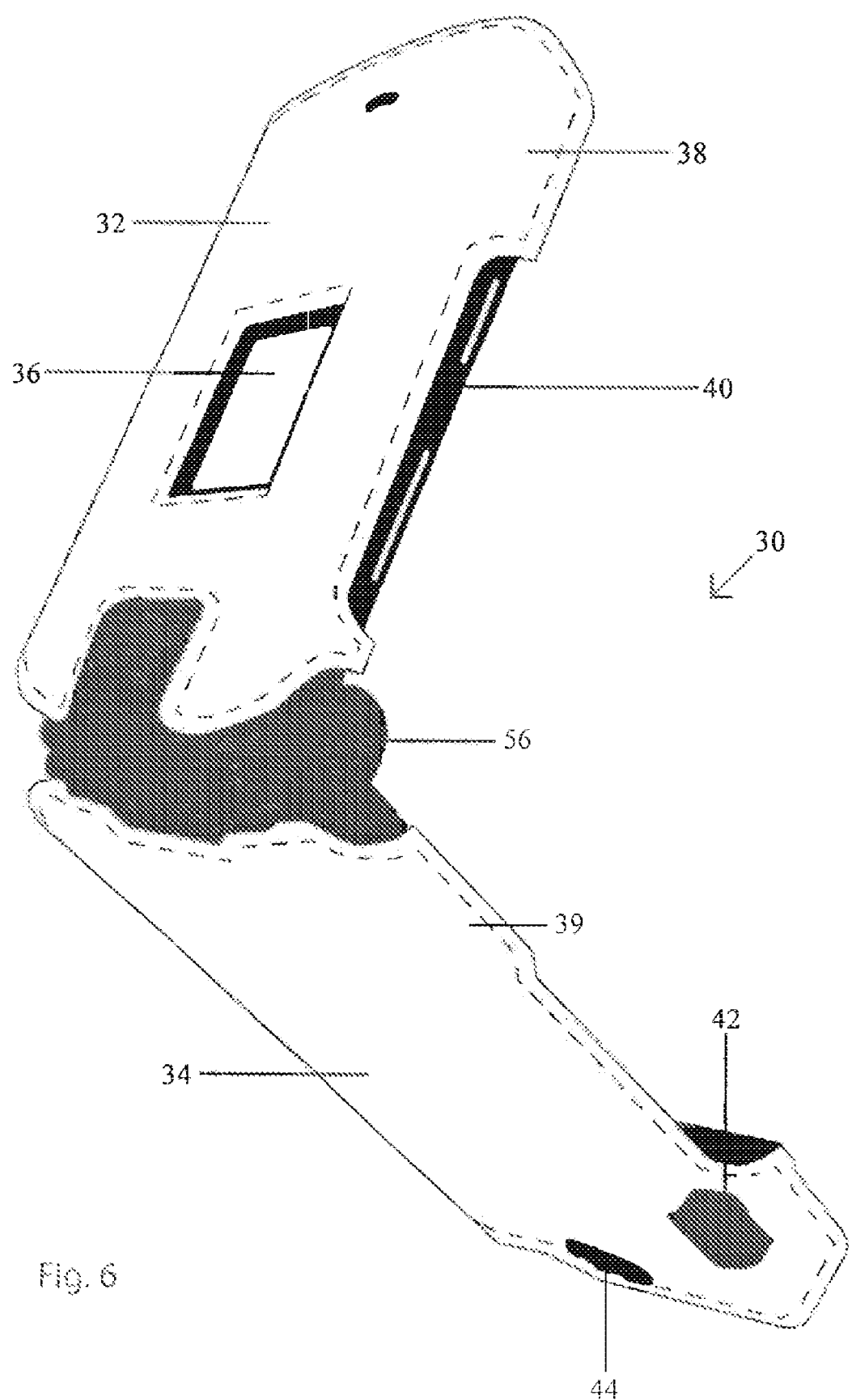
FIG. 6 is a perspective view of the handheld device protective case attached to a sample handheld device in the open position.

FIG. 6 is a perspective view of the handheld device protective case 30 attached to a sample handheld device 56 in the open position. The upper component 32 is attached the handheld device 56 and incorporates at least one viewing window 36 and at least one input/output access port 40 intended to give the end user access to functions found on the handheld device 56. The lower component 34 is attached to the handheld device 56 and incorporates input/output access ports 42 and 44 intended to give the end user access to functions found on the handheld device 56.

As further shown in FIG. 6, the soft outer layer 38 is attached to the outer surface of the upper component 32, and the soft outer layer 39 is attached to the outer surface of the lower component 34. The soft outer layers 38 and 39 are attached utilizing a heat treated chemical which permanently attaches the soft outer layers 38 and 39 to the upper component 32 and lower component 34, respectively.

FIG. 6 further depicts the protective case 30 attached to the sample handheld device 56 which is found in the open position. The input/output access ports 40, 42 and 44 allow for operation of the functions found on the handheld device 56, without the need to remove the protective case 30.

While the foregoing detailed description has described a sample embodiment of a protective case 30 in accordance with the present invention, it is to be understood that the above description is illustrative only and not limiting of the disclosed invention. For example, although the embodiment shown in FIG. 1 through FIG. 6 describes a protective case having two components, the novel feature of the present invention may be applied to a protective case having one or multiple components.

Indeed, it will be appreciated that the embodiments discussed above and other embodiments that are not mentioned could easily be within the scope and spirit of the present invention.

What is claimed is:

1. A protective case for a two-segment portable telephone comprising:
   a first segment, including a fitted cavity formed therein for mounting the associated segment of the portable telephone to the protective case;
   a second segment, separable from said first segment, including at least one fitted notch for mounting the associated segment of the portable telephone to the protective case;
   said first and second segments made up of:
      a protective inner layer composed of a hardened plastic; and
      a soft outer layer permanently affixed to the outside of said protective inner layer.

2. The device as described in claim 1 wherein the protective case has a window for providing exposure to at least a portion of one surface of the associated segment of the portable telephone.

3. The device as described in claim 1 wherein said protective case has at least one access port to allow access to functions found on the portable telephone.

4. A protective case for a handheld device consisting of:
   at least two components, said handheld device having at least two segments to permit the segments to be in an opened position in which none of the surfaces of said handheld device abut each other and in a closed position in which at least two surfaces of said handheld device abut each other, said protective case comprising:
   a first component having a hardened plastic protective inner layer and a soft outer layer, said first component adapted to be mounted on the first segment of the handheld device; and
   a second component, separable from said first component, having a hardened plastic protective inner layer and a soft outer layer, said second component adapted to be mounted on the second segment of the handheld device and including a fitted cavity into which a portion of said second segment fits; and
   whereby said first and second components provide protection to said two segments in both the open and closed position.

5. The device as described in claim 4 wherein at least one of said at least two components has a window for providing exposure to at least a portion of one surface of the associated segment.

6. The device as described in claim 4 wherein at least one of said at least two components has at least one fitted notch to secure said piece to the associated segment of the handheld device.

7. The device as described in claim 4 wherein at least one of said at least two components has at least one access port to allow access to functions found on the handheld device.

8. A two-component protective case for a handheld device having two segmens comprising:
   a first component comprised of:
      a first hardened molded plastic layer designed so as to cover and fit sufficiently tightly to the exterior of a first segment of the handheld device so as to hold said first component in place covering said first segment of the handheld device;
      a first soft material layer, permanently affixed to said first hardened molded plastic layer so as to cover the exterior of said first hardened molded plastic layer and to provide exterior protection and styling for said first segment;
   a second component, separable from said first component, comprised of:
      a second hardened molded plastic layer designed so as to cover and fit sufficiently tightly to the exterior of a second segment of the handheld device so as to hold said second component in place covering said second segment of the handheld device and further including a fitted cavity into which a portion of said second segment of the handheld device securely fits; and
      a second soft marital layer, permanently affixed to said second hardened molded plastic layer so as to cover the exterior of said second hardened molded plastic layer and to provide exterior protection and styling for said second segment.

9. The handheld device two-portion protective case of claim 8 wherein said first and second soft material layers are cloth.

10. The handheld device two-portion protective case of claim 8 wherein said first and second soft marital layers are leather.

11. The handheld device two-portion protective case of claim 8 wherein said first and second soft material layers are a fashionable element for aesthetic purposes.

12. The handheld device two-portion protective case of claim 8 wherein said first and said second hardened molded plastic layer include two or more fitted notches for holding said first and second portions in place covering the handheld device.

13. The handheld device two-portion protective case of claim 8 further comprising at least one window for providing exposure to at least a portion of said first or second portion of the handheld device.

14. The handheld device two-portion protective case of claim 8 further comprised of a window allowing access to a built-in camera on the handheld device.

* * * * *

UNITED STATES PATENT AND TRADEMARK OFFICE
CERTIFICATE OF CORRECTION

PATENT NO. : 7,343,184 B2  Page 1 of 1
APPLICATION NO. : 11/757274
DATED : March 11, 2008
INVENTOR(S) : Ramin Rostami It is certified that error appears in the above-identified patent and that said Letters Patent is hereby corrected as shown below:

Claim 8: Column 6, line 5: The word "segmens" should be deleted and replaced with the word --segments.--

Signed and Sealed this

Twenty-fourth Day of June, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,343,184 B2 |
| APPLICATION NO. | : 11/757274 |
| DATED | : March 11, 2008 |
| INVENTOR(S) | : Ramin Rostami |

It is certified that error appears in the above-identified patent and that said Letters Patent is hereby corrected as shown below:

Claim 8: Column 6, line 5: The word "segmens" should be deleted and replaced with the word --segments--.

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

PATENT NO.        : 7,343,184 B2                                          Page 1 of 1
APPLICATION NO. : 11/757274
DATED             : March 11, 2008
INVENTOR(S)       : Ramin Rostami It is certified that error appears in the above-identified patent and that said Letters Patent is hereby corrected as shown below:

Claim 8: Column 6, line 27: The word "marital" should be deleted and replaced with the word "material."

Claim 10: Column 6, line 36: The word "marital" should be deleted and replaced with the word "material."

Signed and Sealed this

Tenth Day of February, 2009

JOHN DOLL
*Acting Director of the United States Patent and Trademark Office*